(12) United States Patent
Kissell

(10) Patent No.: US 11,422,837 B2
(45) Date of Patent: *Aug. 23, 2022

(54) VIRTUAL MACHINE COPROCESSOR FOR ACCELERATING SOFTWARE EXECUTION

(71) Applicant: ARM Finance Overseas Limited, Cambridge (GB)

(72) Inventor: Kevin D. Kissell, Menlo Park, CA (US)

(73) Assignee: ARM Finance Overseas Limited, Cambridge (GB)

( * ) Notice: Subject to any disclaimer, the term of this patent is extended or adjusted under 35 U.S.C. 154(b) by 153 days.

This patent is subject to a terminal disclaimer.

(21) Appl. No.: 16/036,301

(22) Filed: Jul. 16, 2018

(65) Prior Publication Data

US 2018/0341504 A1  Nov. 29, 2018

Related U.S. Application Data

(63) Continuation of application No. 14/953,804, filed on Nov. 30, 2015, now Pat. No. 10,055,237, which is a continuation of application No. 10/637,005, filed on Aug. 8, 2003, now Pat. No. 9,207,958.

(60) Provisional application No. 60/492,312, filed on Aug. 5, 2003, provisional application No. 60/403,126, filed on Aug. 12, 2002.

(51) Int. Cl.
*G06F 9/455* (2018.01)
*G06F 9/38* (2018.01)

(52) U.S. Cl.
CPC ........ *G06F 9/45516* (2013.01); *G06F 9/3836* (2013.01); *G06F 9/455* (2013.01)

(58) Field of Classification Search
None
See application file for complete search history.

(56) References Cited

U.S. PATENT DOCUMENTS

| 4,200,927 A | 4/1980 | Hughes et al. |
| 4,787,026 A | 11/1988 | Barnes et al. |
| 4,839,745 A | 6/1989 | Tindall |

(Continued)

FOREIGN PATENT DOCUMENTS

| WO | WO 01/71494 A2 | 9/2001 |
| WO | WO 01/71494 A3 | 9/2001 |

(Continued)

OTHER PUBLICATIONS

Application and File history for U.S. Appl. No. 10/637,005, filed Aug. 8, 2003. Inventor: Kevin D. Kissell.

(Continued)

*Primary Examiner* — John M Lindlof
(74) *Attorney, Agent, or Firm* — Patterson Thuente Pedersen, P.A.

(57) ABSTRACT

In one general aspect, a system includes an abstract machine instruction stream, a virtual machine coprocessor configured to receive an instruction from the abstract machine instruction stream and to generate one or more native machine instructions in response to the received instruction, and a processor coupled to the virtual machine coprocessor and operable to execute the native machine instructions generated by the virtual machine coprocessor. The virtual machine coprocessor is operable to generate one or more native machine instructions to explicitly control the virtual machine coprocessor.

18 Claims, 6 Drawing Sheets

(56) References Cited

U.S. PATENT DOCUMENTS

| | | | |
|---|---|---|---|
| 5,937,193 A | 8/1999 | Evoy | |
| 5,953,741 A | 9/1999 | Evoy et al. | |
| 5,970,242 A | 10/1999 | O'Connor et al. | |
| 6,085,307 A | 7/2000 | Evoy et al. | |
| 6,125,439 A | 9/2000 | Tremblay et al. | |
| 6,189,141 B1* | 2/2001 | Benitez | G06F 8/443 714/E11.209 |
| 6,233,678 B1* | 5/2001 | Bala | G06F 11/3612 712/239 |
| 6,295,645 B1 | 9/2001 | Brewer | |
| 6,298,434 B1 | 10/2001 | Lindwer | |
| 6,330,658 B1 | 12/2001 | Evoy et al. | |
| 6,332,215 B1* | 12/2001 | Patel | G06F 9/30174 717/141 |
| 6,349,377 B1 | 2/2002 | Lindwer | |
| 6,535,905 B1 | 3/2003 | Kalafatis et al. | |
| 6,609,247 B1 | 8/2003 | Dua et al. | |
| 6,910,207 B2 | 6/2005 | Steinbusch | |
| 6,976,254 B2 | 12/2005 | Kramskoy | |
| 7,107,585 B2 | 9/2006 | Berent et al. | |
| 7,124,407 B1* | 10/2006 | Wallman | G06F 9/45504 717/154 |
| 7,146,613 B2 | 12/2006 | Chauvel et al. | |
| 7,210,140 B2 | 4/2007 | Lindwer et al. | |
| 7,747,989 B1 | 6/2010 | Kissell | |
| 9,207,958 B1 | 12/2015 | Kissell | |
| 10,055,237 B2 | 8/2018 | Kissell | |
| 2001/0052118 A1 | 12/2001 | Steinbusch | |
| 2002/0019976 A1 | 2/2002 | Patel et al. | |
| 2002/0053072 A1 | 5/2002 | Steinbusch et al. | |
| 2003/0023958 A1 | 1/2003 | Patel et al. | |
| 2003/0028451 A1* | 2/2003 | Ananian | G06Q 30/02 705/26.42 |
| 2003/0061254 A1 | 3/2003 | Lindwer et al. | |
| 2003/0086620 A1* | 5/2003 | Lucco | G06F 8/4434 382/232 |
| 2003/0101208 A1 | 5/2003 | Chauvel et al. | |
| 2004/0015896 A1 | 1/2004 | Doman et al. | |
| 2005/0125790 A1 | 6/2005 | Ben-Yedder et al. | |

FOREIGN PATENT DOCUMENTS

| | | |
|---|---|---|
| WO | WO 02/19100 A1 | 3/2002 |
| WO | WO 02/27488 A2 | 4/2002 |
| WO | WO 03/027842 A2 | 4/2003 |
| WO | WO03/029961 A1 | 4/2003 |
| WO | WO 03/034243 A1 | 4/2003 |
| WO | WO 03/036467 A1 | 5/2003 |
| WO | WO 03/088036 A1 | 10/2003 |

OTHER PUBLICATIONS

Application and File history for U.S. Appl. No. 10/637,006, filed Aug. 8, 2003. Inventor: Kevin D. Kissell.

Application and File history for U.S. Appl. No. 14/953,804, filed Nov. 30, 2015. Inventor: Kevin D. Kissell.

Wong, W., "Java Processors, Coprocessor Perform Direct Bytecode Execution," *Electronic Design Online No. 4538*, 5 pages, Jul. 2000.

Anand Lal Shimpi, "Intel's NetBurst Architecture—The Pentium 4's innards get a name," AnandTech (Aug. 20, 2000) 10 pages; downloaded on Jun. 29, 2007, from http://www.anandtech.com/printarticle.aspx?i=1301.

*Core Coprocessor Interface Specification*, MIPS Technologies Document No. MD00068, Revision 1.15, Entire document: 30 pages, Sep. 25, 2002.

Levy, M., "Java To Go: Part 1," *Microprocessor Report*, vol. 15, Archive 2, pp. 1 and 5-7, Feb. 2001.

Levy, M., "Java To Go: Part 2," *Microprocessor Report*, pp. 7-8, Mar. 2001.

Levy, M., "Java To Go: Part 3," *Microprocessor Report*, pp. 9-11, Mar. 2001.

Levy, M., "Java To Go: Part 4," *Microprocessor Report*, vol. 15, Archive 6, pp. 1 and 5-8, Jun. 2001.

*MIPS32™ Architecture For Programmers Volume I: Introduction to the MIPS32™ Architecture*, MIPS Technologies Document No. MD00082, Revision 0.95, Entire document: 77 pages, Mar. 12, 2001.

*MIPS32™ Architecture For Programmers Volume II: The MIPS32™ Instruction Set*, MIPS Technologies Document No. MD00086, Revision 0.95, Entire document: 253 pages, Mar. 12, 2001.

*MIPS32™ Architecture For Programmers Volume III: The MIPS32™ Privileged Resource Architecture*, MIPS Technologies Document No. MD00090, Revision 0.95, Entire document: 109 pages, Mar. 12, 2001.

*MIPS64® Architecture For Programmers Volume I: Introduction to the MIPS64® Architecture*, MIPS Technologies Document No. MD00083, Revision 2.50, Entire document: 97 pages, Jul. 1, 2005.

*MIPS64® Architecture For Programmers Volume II: The MIPS64® Instruction Set*, MIPS Technologies Document No. MD00087, Revision 2.50, Entire document: 409 pages, Jul. 1, 2005.

*MIPS64® Architecture For Programmers Volume III: The MIPS64® Privileged Resource Architecture*, MIPS Technologies Document No. MD00091, Revision 2.50, Entire document: 167 pages, Jul. 1, 2005.

* cited by examiner

| 31 | 26 | 25 | 21 | 20 | 16 | 15 | 6 | 5 | 0 |
|---|---|---|---|---|---|---|---|---|---|
| COP2 010010 | | COPOP0 10000 | | rs | | 0000000000 | | SVMPC 000001 | |
| 6 | | 5 | | 5 | | 10 | | 6 | |

SVMPSC: Set VMPC and Clear Branch Interlock

FIG. 8A

| 31 | 26 | 25 | 21 | 20 | 16 | 15 | 11 | 10 | 6 | 5 | 0 |
|---|---|---|---|---|---|---|---|---|---|---|---|
| COP2 010010 | | MHF 01011 | | rt | | cs | | 00000 | | COPMOV 000000 | |
| 6 | | 5 | | 5 | | 5 | | 5 | | 6 | |

MHFC2: Move Signed Halfword from Coprocessor Register

FIG. 8B

| 31 | 26 | 25 | 21 | 20 | 16 | 15 | 11 | 10 | 6 | 5 | 0 |
|---|---|---|---|---|---|---|---|---|---|---|---|
| COP2 010010 | | MHF 01010 | | rt | | cs | | 00000 | | COPMOV 000000 | |
| 6 | | 5 | | 5 | | 5 | | 5 | | 6 | |

MHUFC2: Move Unsigned Halfword from Coprocessor Register

FIG. 8C

| 31 | 26 | 25 | 21 | 20 | 16 | 15 | 11 | 10 | 6 | 5 | 0 |
|---|---|---|---|---|---|---|---|---|---|---|---|
| COP2 010010 | | MHF 01001 | | rt | | cs | | 00000 | | COPMOV 000000 | |
| 6 | | 5 | | 5 | | 5 | | 5 | | 6 | |

MBFC2: Move Signed Byte from Coprocessor Register

FIG. 8D

| 31 | 26 | 25 | 21 | 20 | 16 | 15 | 11 | 10 | 6 | 5 | 0 |
|---|---|---|---|---|---|---|---|---|---|---|---|
| COP2 010010 | | MHF 01000 | | rt | | cs | | 00000 | | COPMOV 000000 | |
| 6 | | 5 | | 5 | | 5 | | 5 | | 6 | |

MBUFC2: Move Unsigned Byte from Coprocessor Register

FIG. 8E

| 31 | 26 | 25 | 21 | 20 | 16 | 15 | 11 | 10 | 6 | 5 | 0 |
|---|---|---|---|---|---|---|---|---|---|---|---|
| COP2 010010 | | COPOP0 10000 | | rt | | cs | | W 00000 | | INR 000010 | |
| 6 | | 5 | | 5 | | 5 | | 5 | | 6 | |

INRW: Move Word to Register and Insert Value into Backing Structure

FIG. 8F

| 31 | 26 | 25 | 21 | 20 | 16 | 15 | 11 | 10 | 6 | 5 | 0 |
|---|---|---|---|---|---|---|---|---|---|---|---|
| COP2 010010 | | COPOP0 10000 | | rt | | cs | | D 00001 | | INR 000010 | |
| 6 | | 5 | | 5 | | 5 | | 5 | | 6 | |

INRD: Move Double to Register and Insert Value into Backing Structure

FIG. 8G

| 31 | 26 | 25 | 21 | 20 | 16 | 15 | 11 | 10 | 6 | 5 | 0 |
|---|---|---|---|---|---|---|---|---|---|---|---|
| COP2 010010 | | COPOP0 10000 | | rt | | cs | | W 00000 | | EXR 000011 | |
| 6 | | 5 | | 5 | | 5 | | 5 | | 6 | |

EXRW: Extract Value from Backing Structure and Move Word from Register

FIG. 8H

| 31 | 26 | 25 | 21 | 20 | 16 | 15 | 11 | 10 | 6 | 5 | 0 |
|---|---|---|---|---|---|---|---|---|---|---|---|
| COP2 010010 | | COPOP0 10000 | | rt | | cs | | D 00001 | | EXR 000011 | |
| 6 | | 5 | | 5 | | 5 | | 5 | | 6 | |

EXRW: Extract Value from Backing Structure and Move Double from Register

FIG. 8I

VIRTUAL MACHINE COPROCESSOR FOR ACCELERATING SOFTWARE EXECUTION

CROSS-REFERENCE TO RELATED APPLICATIONS

This application is a continuation of application Ser. No. 14/953,804 filed Nov. 30, 2015, which in turn is a continuation of application Ser. No. 10/637,005 filed Aug. 8, 2003, now U.S. Pat. No. 9,207,958 issued Dec. 8, 2015, which claims the benefit of U.S. Provisional Application No. 60/403,126 filed Aug. 12, 2002 and U.S. Provisional Application No. 60/492,312, filed Aug. 5, 2003, each of which is hereby fully incorporated by reference. This application is related to U.S. application Ser. No. 10/637,006, titled "Virtual Machine Coprocessor Facilitating Dynamic Compilation," filed Aug. 8, 2003, now U.S. Pat. No. 7,747,989 issued Jun. 29, 2010, which is incorporated by reference.

TECHNICAL FIELD

This document describes a virtual machine coprocessor and techniques for accelerating the execution of software prepared to run on a virtual machine.

BACKGROUND

A virtual machine is an abstract computational environment that allows platform independent compilation of software applications. Software may be compiled and optimized to produce bytecodes for execution in the abstract computational environment. The virtual machine, often implemented as a software application, executes the compiled bytecodes to provide an interface between the abstract computational environment and a computer system. Instead of requiring recompilation for each supported platform, the bytecodes may be executed on any platform that implements the virtual machine.

By inserting a layer of abstraction, a virtual machine architecture increases software portability without overly impairing execution efficiency. In its simplest form, a virtual machine can be implemented by creating a software emulation of the abstract computational environment. Each supported platform provides a virtual machine that implements the abstract computational environment. Because the bytecodes are compiled, they may be executed on each supported platform without further compilation or processing other than that required by the virtual machine in emulating the abstract computational environment.

"Several companies have developed virtual machine environments to provide multi-platform support in a Web services architecture, such as Sun Microsystems' Java Virtual Machine (JVM) or Microsoft's Common Language Runtime (CLR). Microsoft's .Net Web services architecture uses the Microsoft CLR virtual machine to support a wide variety of programming languages. Software written in any supported programming language may be compiled for execution on the abstract computational environment implemented by the CLR virtual machine. As the use of virtual machines increases, it becomes more important to increase their performance.

SUMMARY

In one general aspect, a system includes an abstract machine instruction stream, a virtual machine coprocessor configured to-receive an instruction from the abstract machine instruction stream and to generate one or more native machine instructions in response to the received instruction, and a processor coupled to the virtual machine coprocessor and operable to execute the native machine instructions generated by the virtual machine coprocessor. The virtual machine coprocessor is operable to generate one or more native machine instructions to explicitly control the virtual machine coprocessor.

The one or more native machine instructions may be stored in a computer-readable medium, such as, for example, a dedicated random access memory array, coupled to the processor and the virtual machine coprocessor. The abstract machine instruction stream includes virtual machine instructions, such as, for example, Java virtual machine instructions or Common Language Runtime instructions.

In some implementations, the virtual machine coprocessor is operable to explicitly control the virtual machine coprocessor by generating one or more native machine instructions which cause at least one abstract machine instruction to be inserted into or removed from the abstract machine instruction stream. The virtual machine coprocessor includes a coprocessor register such that the virtual machine coprocessor is operable to explicitly control the virtual machine coprocessor by generating one or more native machine instructions to modify the contents of the coprocessor register. For example, coprocessor registers may be used to store a virtual machine program counter (VMPC) or a branch interlock.

In another general aspect, a system includes an abstract machine instruction stream, a first native instruction stream, a second native instruction stream, a virtual machine coprocessor configured to receive an instruction from the abstract machine instruction stream, and to generate a first set of native machine instructions for insertion into the first native instruction stream and a second set of native machine instructions for insertion into the second native instruction stream, and a processor coupled to the virtual machine coprocessor and operable to execute instructions from the first native instruction stream or the second native instruction stream. The abstract machine instruction stream may be stored in a computer-readable medium coupled to the processor and the virtual machine coprocessor.

In some implementations, the first native instruction stream and the second native instruction stream are each stored in a computer-readable medium, such as, for example, a dedicated random access memory array, coupled to the processor and the virtual machine coprocessor. The first and second native instruction streams may be stored in the same or separate computer-readable mediums.

The abstract machine instruction stream may include a conditional branch instruction such that a condition determines whether a first set of abstract machine instructions or a second set of abstract machine instructions is processed, and the virtual machine coprocessor generates the first set of native machine instructions corresponding to the first set of abstract machine instructions and the second set of native machine instructions corresponding to the second set of abstract machine instructions.

In another general aspect, a virtual machine coprocessor includes an abstract machine instruction interface that receives an abstract machine instruction stream, virtual machine coprocessor core logic coupled to the abstract machine instruction interface to receive an abstract machine instruction and generate one or more native machine instructions, and a native machine instruction interface that provides the generated one or more native machine instructions for execution by a processor. The virtual machine coprocessor core logic is operable to generate one or more native machine instructions to explicitly control the virtual machine coprocessor.

Implementations may include a microcode store coupled to the virtual machine coprocessor logic such that the microcode store is operable to provide one or more microinstructions to the virtual machine coprocessor logic to facilitate the generation of the one or more native machine instructions corresponding to a received abstract machine instruction. The native instructions may include an instructions to insert at least one abstract machine instruction into the abstract machine instruction stream.

In another general aspect, a virtual machine coprocessor includes an abstract machine instruction interface that receives an abstract machine instruction stream, virtual machine coprocessor core logic coupled to the abs act machine instruction interface to receive abstract machine instructions through the abstract machine instruction interface and generate a first native machine instruction stream and a second native machine instruction stream in response to the received abstract machine instruction stream, and a native machine instruction interface coupled to the virtual machine coprocessor logic and operable to provide the first native machine instruction stream or the second native machine instruction stream for execution by a processor. The native machine instruction interface may include a computer-readable medium corresponding to the first native machine instruction stream and a computer-readable medium corresponding to the second native machine instruction stream.

In some implementations, the abstract machine instruction stream includes a conditional branch instruction such that a condition determines whether a first set of abstract machine instructions or a second set of abstract machine instructions is processed, and the virtual machine coprocessor generates a first set of native machine instructions corresponding to the first set of abstract machine instructions for execution by a first processor and a second set of native machine instructions corresponding to the second set of abstract machine instructions for execution by a second processor.

In another general aspect, a method for accelerating virtual machine execution includes receiving abstract machine instructions and for each received abstract machine instruction, generating one or more native machine instructions using a virtual machine coprocessor and inserting the one or more native machine instructions into a native machine instruction stream, generating a native machine instruction operable to explicitly control the virtual machine coprocessor and inserting the native machine instruction into the native machine instruction stream, and executing instructions from the native machine instruction stream.

Additional, techniques herein may be implemented as a computer-readable medium including an integrated circuit embodied in software. The details of one or more implementations are set forth in the accompanying drawings and the description below. Other features and advantages will be apparent from the description and drawings, and from the claims.

DESCRIPTION OF DRAWINGS

FIGS. 8A-8I describe instruction formats for exemplary virtual machine coprocessor instructions.

DETAILED DESCRIPTION

Several techniques may be used to increase the performance of software execution on virtual machines. First, compilers may be enhanced to better optimize compiled bytecodes. Second, the virtual machine may be improved to produce native machine code optimized for a target platform (e.g., just-in-time compilation). Third, hardware support may be provided to improve the performance of the virtual machine. The techniques described herein focus on providing hardware support to improve the performance of a virtual machine.

As discussed above, a virtual machine provides an abstract computational environment for software execution. When this computational environment is very similar to the underlying target platform, the instruction set architecture of the virtual machine may be mapped to the instruction set architecture of the target platform to provide reasonably efficient execution. However, when this computational environment diverges from the underlying target platform, the complexity of the virtual machine increases. For example, the Java Virtual Machine (JVM) implements a stack-based computational environment. Because typical reduced-instruction set computer (RJSC) architectures are not stack-based, a RISC-based JVM implementation does not have native support for stack-based operations. One technique that may be used to provide hardware support for operations unsupported by the native target platform is to provide a virtual machine coprocessor.

A coprocessor is a device, either part of or closely-coupled to a central processing unit (CPU), that executes a set of reserved instruction encodings. A virtual machine coprocessor extends the native instruction set architecture to support a virtual machine. For example, a virtual machine coprocessor may implement an extended instruction set architecture by receiving instructions in the extended instruction set architecture and translating them into one or more native instructions for execution by the CPU.

Hardware Architecture

Figure 1:
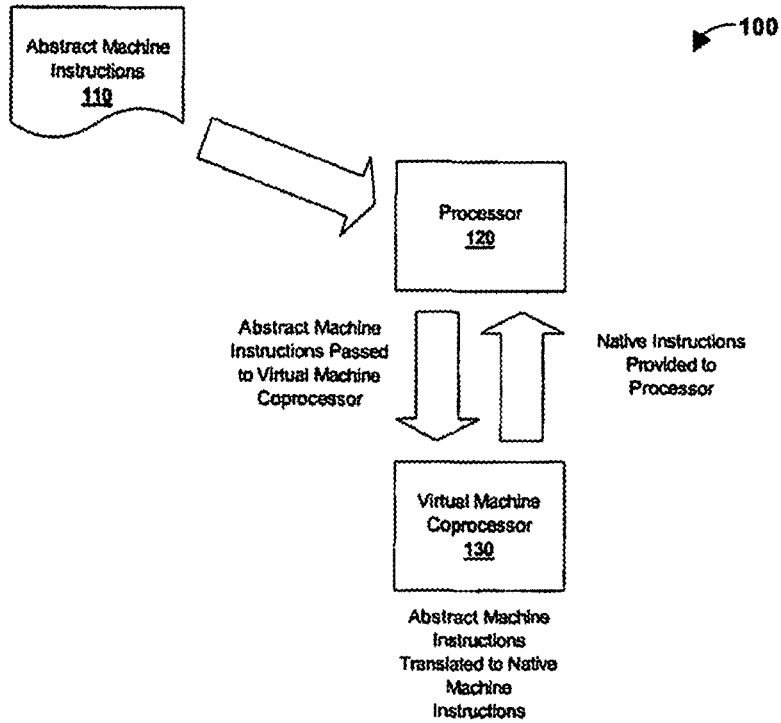
FIG. 1 is a block diagram of a system with a virtual machine coprocessor.

Referring to FIG. 1, system 100 provides hardware support for executing abstract machine instructions 110 on a processor 120. The processor 120 receives abstract machine instructions 110, such as, for example, Java Virtual Machine (JVM) instructions, and passes them to a virtual machine coprocessor 130 that translates the instructions into native machine instructions that can be provided to processor 120 for execution.

The abstract machine instructions 110 include any instructions destined for processing by the virtual machine coprocessor 130. For example, a JVM integer addition instruction (IADD) is a stack-based arithmetic operation. The virtual machine coprocessor 130 may be used to translate execution of the instruction into one or more native machine instructions supported by the processor 120. In this manner, the virtual machine coprocessor 130 may be used to support one or more virtual machine architectures, such as, for example, the JVM or Microsoft's Common Language Runtime (CLR) virtual machine.

The virtual machine coprocessor 130 is closely coupled to the processor 120 to exploit the various efficiencies of the processor 120. For example, the virtual machine coprocessor 130 may exploit memory management capabilities provided by or associated with the processor 120, such as, for example, a cache or memory management unit (MMU). Additionally, the virtual machine coprocessor 130 implements one or more instruction memories, such as, for example, instruction scratchpad random access memory (ISPRAM) arrays, to provide the processor 130 with a fast mechanism for fetching translated instructions for execution.

The virtual machine coprocessor 130 is closely coupled to the processor 120 using an interface, such as, for example, the MIPS32/MIPS64 Coprocessor 2 (Cop2). See "Core Coprocessor Interface Specification," Document Number MD00068, MIPS Technologies, Inc. (2002), which is hereby incorporated by reference in its entirety for all purposes. This interface allows the processor 120 to explicitly load abstract machine instructions 110 into the virtual machine coprocessor 130.

The virtual machine coprocessor 130 translates the abstract machine instructions 110 into native instructions that may be executed by processor 120. In some implementations, core logic is provided to perform the translations. To make the translations more configurable, implementations may utilize a microcode store to encode mappings between abstract virtual machine instructions 110 and native machine instructions such that the mappings may be more easily reconfigured.

Translated instructions may be explicitly read by the processor 120 through a coprocessor interface (e.g., the Cop2 interface). However, because minimum latency is critical, an instruction memory is used so that the processor 120 may efficiently fetch and execute the translated instructions.

To better illustrate the operation of the system 100, consider the translation of the JVM IADD instruction to a RISC instruction set architecture such as the well known MIPS instruction set architecture. The IADD instruction is a stack-based arithmetic operation that pops two values off a stack, adds the values, and pushes the result back onto the stack. In a stack-less RISC architecture, there is no native machine instruction to implement this functionality. A virtual machine coprocessor 130 may be used to translate the IADD instruction to one or more native instructions to improve the performance of the JVM.

If the stack remains small enough so that its values may be stored in registers, then the IADD instruction may be simply translated into a native add instruction (e.g., "ADD r25, r25, r26"). However, if the stack grows larger than the number of available registers, then this implementation may not be possible. Alternatively, the stack functionality may be implemented by storing the contents of the stack in memory instead of in registers. Table 1 illustrates one possible translation of IADD to native machine instructions by implementing a stack.

TABLE 1

Translation of IADD MIPS Instructions

| | |
|---|---|
| LW $t0,0(JSP) | #pop first operand |
| LW $t1,4(JSP) | #pop second operand |
| ADD $t0,$t0,$1 | #perform addition |
| ADDI JSP,JSP,4 | #adjust stack pointer |
| SW $t0,0(JSP) | #push result |

In Table 1, a stack pointer (JSP) is used to identify the top of the stack. JSP is a symbolic name for a general-purpose register used to store the stack pointer. In this example, the stack pointer grows downward as data is pushed onto the stack. The first two instructions load data from the stack and store the data in registers. Next, the values are added and stored in a temporary register. Then, the stack pointer is adjusted and the result of the addition is stored. In this example, the virtual machine coprocessor 130 translates the single IADD instruction into 5 native instructions for execution by processor 120.

Figure 2:
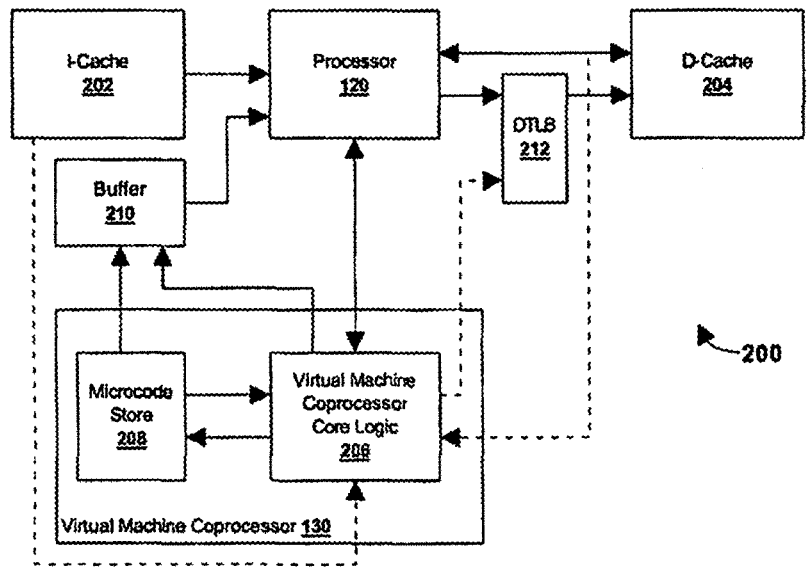
FIG. 2 is a block diagram of a more detailed implementation of the system shown in FIG. 1.

Referring to FIG. 2, system 200 is a more detailed implementation of the system 100 shown in FIG. 1. System 200 includes a processor 120 closely coupled to a virtual machine coprocessor 130. This close coupling allows the virtual machine coprocessor 130 to access an instruction cache 202 or a data cache 204 used by the processor 120. The virtual machine coprocessor 130 includes virtual machine coprocessor core logic 206 and a microcode store 208. The virtual machine coprocessor 130 translates abstract machine instructions 110 and loads them into buffer 210 so that the processor 120 may fetch and execute the translated instructions. A data translation look-aside buffer (DTLB) 212 can be used by both the processor 120 and the virtual machine coprocessor 130 to translate virtual addresses to physical addresses.

In this implementation, the heart of the virtual machine coprocessor 130 is a microcoded engine that takes inputs from a virtual machine instruction buffer and translates the inputs to generate sequences of instructions which are written into one or more native instruction buffers for execution by processor 120.

Figure 3:
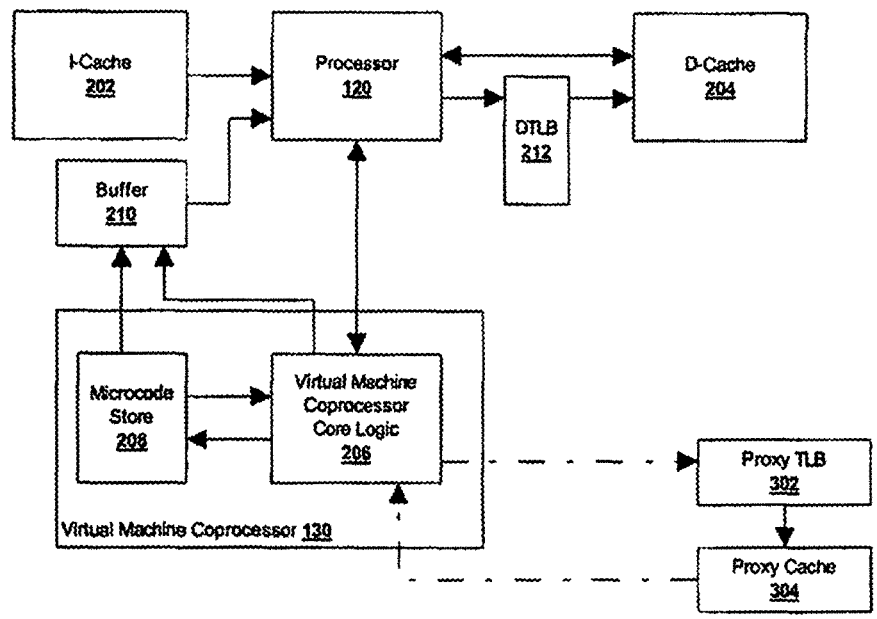
FIG. 3 is a block diagram of a system having a virtual machine coprocessor with an independent proxy cache and translation look-aside buffer.

Referring to FIG. 3, the implementations described above tightly couple virtual machine coprocessor 130 to the processor 120 using shared memory interfaces. Any other memory interface techniques may be used to couple them together. For example, FIG. 3 includes a separate proxy TLB 302 and a proxy cache 304. These proxy memory interfaces are managed by the processor 120 for use by the virtual machine coprocessor 130.

The implementation described with reference to FIG. 2 allows both the processor 120 and the virtual machine coprocessor 130 to access the DTLB 212, the instruction cache 202, and the data cache 204 through a shared interface. To provide a shared interface, some complexity is introduced to ensure appropriate behavior when one or both devices write using a shared interface. Additionally, shared interfaces may introduce bandwidth limitations that adversely affect system performance. By adding the proxy TLB 302 and the proxy cache 304, the system 300 eliminates potential memory bandwidth problems caused by shared interfaces.

Multiprocessor Execution

In the implementations described above, the virtual machine coprocessor 130 translates a stream of abstract machine instructions 110 into native machine code for execution by processor 120. If the virtual machine is executed on a multiprocessor platform, it may be desirable to further optimize the virtual machine by executing instructions on more than one processor 120.

Figure 4:
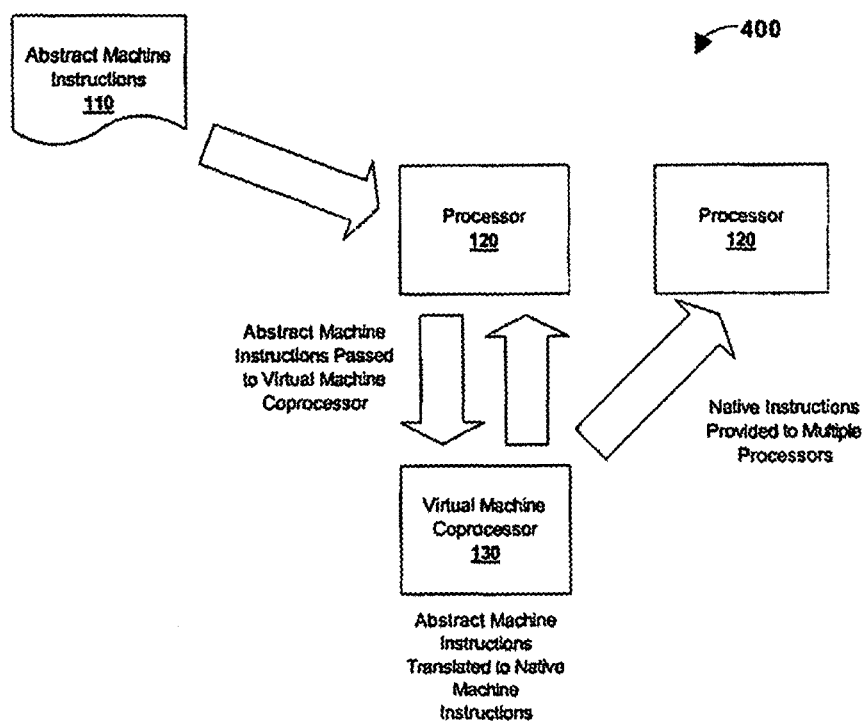
FIG. 4 is a block diagram of a virtual machine coprocessor that issues native instructions to multiple processors.

Referring to FIG. 4, the virtual machine coprocessor 130 translates abstract machine instructions 110 to native machine instructions that may be fetched and executed by processor 120. If multiple processors 120 are available, the virtual machine coprocessor 130 may be configured to receive a stream of abstract machine instructions 110 and generate multiple sequences of native machine instructions so that the sequences may be executed in parallel by multiple processors 120. Each of the multiple processors 120 includes a native instruction buffer 210 to receive one or more native instructions for execution on that processor 120. In this implementation, the virtual machine coprocessor inserts one or more sequences of native machine instructions into the native instruction buffer 210 of a processor 120 to have those instructions executed by that processor 120.

Many techniques have been developed to exploit multiprocessing capabilities. For example, a dependency analysis may be performed to identify paths of execution that execute independently from one another. For example, the abstract machine instructions 110 may include an arithmetic operation followed by a memory load operation. If the system determines that these operations are independent, then the arithmetic operation may be executed by one processor and the memory load operation executed by another processor. Any technique to distribute instructions to multiple processors 120 may be employed by the system 400.

Coprocessor Control Feedback

In some implementations, the instruction set architecture of the processor 120 includes one or more instructions to determine and/or modify the state of the virtual machine coprocessor 130. For example, the virtual machine coprocessor 130 may include various registers that are used by the virtual machine coprocessor 130 to translate instructions. One such register is a virtual machine program counter (VMPC). The virtual machine coprocessor 130 may generate instructions for the processor 120 to read, modify, or otherwise interact with the virtual machine coprocessor 130, which results in greater flexibility and control. This coprocessor control feedback technique allows the virtual machine coprocessor 130 to take advantage of the capabilities of the processor 120 in efficiently translating abstract machine instructions 110 to native instructions.

Using coprocessor control feedback, the virtual machine coprocessor 130 can direct the processor 120 to update registers of the virtual machine coprocessor 130 to vary the execution of a stream of translated native instructions. For example, when the virtual machine coprocessor 130 encounters a conditional branch instruction, the coprocessor 130 may not be able to determine which branch will be taken before the processor 120 performs necessary operations (e.g., before the processor 120 performs an arithmetic comparison). One technique for addressing this situation is to have the virtual machine coprocessor 130 provide a virtual machine program counter (VMPC) and a branch interlock (BI) register. To handle conditional branches, the virtual machine coprocessor 130 issues native machine instructions to evaluate the branch condition and update the virtual machine coprocessor 130 accordingly.

Until the branch condition is evaluated, the BI register is set to temporarily halt instruction translation. Once the branch condition is evaluated, the virtual machine coprocessor 130 should resume translation at one of two places based on the condition. The processor 120 can identify the next abstract machine instruction 110 to be executed and. clear the BI register using a virtual machine coprocessor instruction. Allowing the virtual machine coprocessor 130 to generate native machine instructions to view and/or modify its state increases the flexibility and power of the system 100.

Virtual Machine Instruction Buffer

Various incompatibilities or differences may exist between the abstract machine instructions 110 and native instructions supported by the processor 120. For example, some implementations may provide a processor 120 that implements a register-based, fixed-length instruction set architecture using a big-endian byte order. If the abstract machine instructions are stack-based, variable-length instructions using a little-endian byte order, then additional processing or translation may be needed for the virtual machine coprocessor 130 to generate native instructions from abstract machine instructions.

Virtual machines typically encode multi-byte immediate values in their instruction streams in either big-endian or little-endian byte orders. For example, Java encodes multi-byte immediate values using big-endian encodings (i.e., the most significant byte of a 16-bit or 32-bit value comes first in the instruction stream), while Microsoft's CLR uses little-endian encodings (i.e., the least significant byte comes first).

Figure 5A:
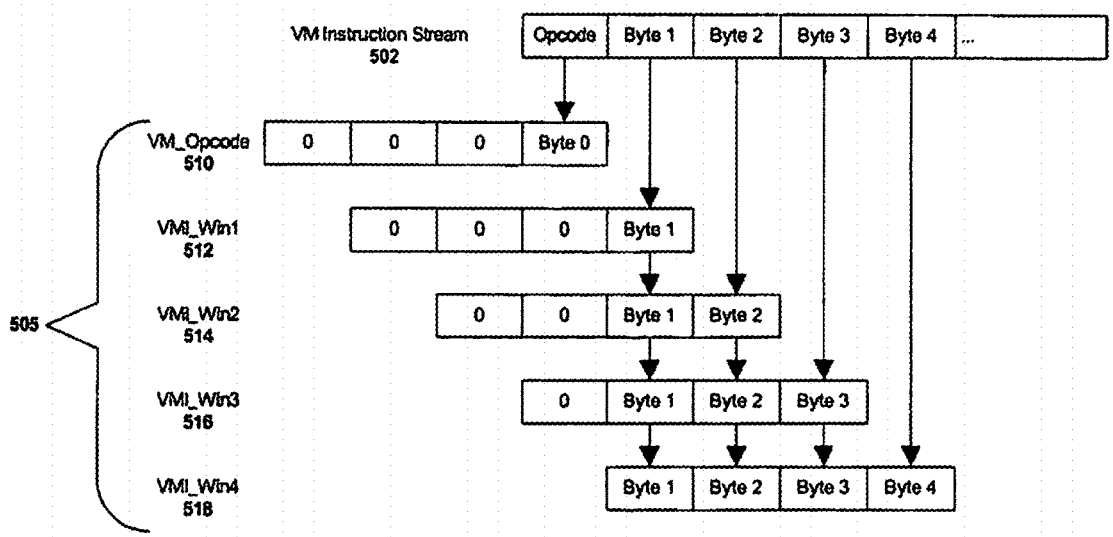
FIG. 5A is a diagram of the mappings between a virtual machine instruction stream and virtual machine instruction windows for abstract machine instructions using big-endian byte order.

Referring to FIG. 5A, the virtual machine coprocessor 130 may support a virtual machine instruction stream 502 containing multi-byte immediate values in varying byte orders by using one or more virtual machine instruction (VMI) windows 505 stored, for example, in virtual machine coprocessor 130 registers. In this implementation for a big-endian virtual machine, five VMI windows 505 are used by the virtual machine coprocessor 130 as follows: (1) VM_Opcode register 510 stores the opcode of an abstract machine instruction 110; (2) VMI_Win1 register 512 stores the contents of the first byte following the opcode in the virtual machine instruction stream 502; (3) VMI_Win2 register 514 stores the first two bytes following the opcode; (4) VMI_Win3 register 516 stores the first three bytes following the opcode; and (5) VMI_Win4 register 518 stores the first four bytes following the opcode.

These VMI windows 505 allow the virtual machine coprocessor 130 to access immediate values of various lengths in the abstract machine instruction 110. The following table illustrates an example of the relationship between the virtual machine instruction stream 502 and the VMI windows 505.

TABLE 2

| Name | Contents |
| --- | --- |
| Virtual Machine Instructions Stream | 0x80 a3 42 79 c3 |
| VM_Opcode | 0x00 00 00 80 |
| VMI_Win1 | 0x00 00 00 a3 |
| VMI_Win2 | 0x00 00 a3 42 |
| VMI_Win3 | 0x00 a3 42 79 |
| VMI_Win4 | 0xa3 42 79 c3 |

As shown in Table 2, the virtual machine coprocessor 130 may access an 8-bit, 16-bit, 24-bit, or 32-bit immediate value from the virtual machine instruction stream 502 using the VMI windows 505.

Figure 5B:
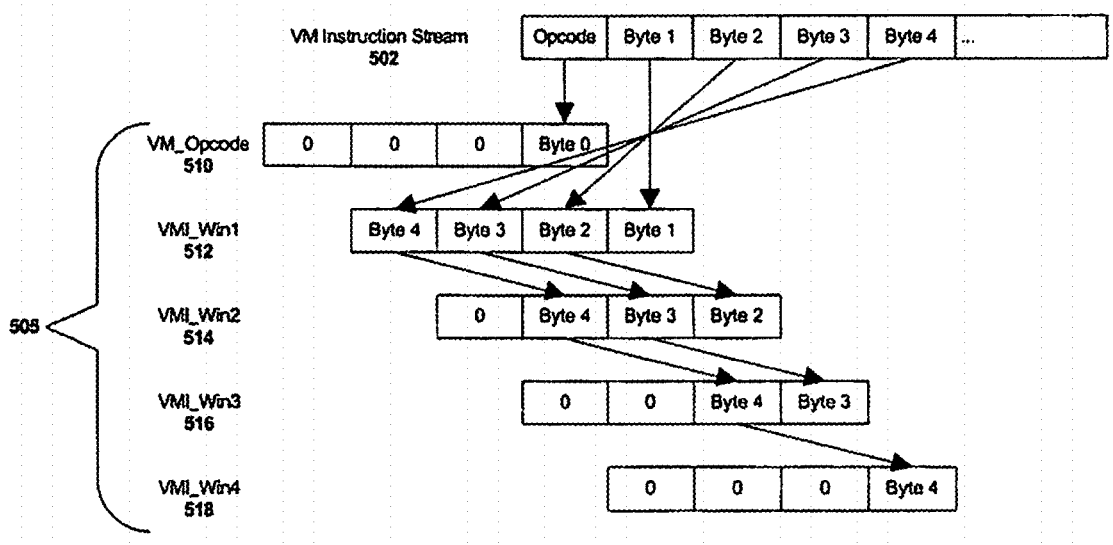
FIG. 5B is a diagram of the mappings for abstract machine instructions using little-endian byte order.

Referring to FIG. 5B, the techniques described with respect to FIG. 5A likewise may be used to access immediate values in a virtual machine instruction stream 502 represented in little-endian byte order. In this implementation, the values are converted to internal register representations for processing by the virtual machine coprocessor 130 using five VMI windows 505 as follows: (1) VM_Opcode register 510 stores the opcode of an abstract machine instruction 110; (2) VMI_Win1 register 512 stores the contents of the first four bytes following-the opcode in the virtual machine instruction stream 502; (3) VMI_Win2 register 514 stores the second, third, and fourth bytes following the opcode; (4) VMI_Win3 register 516 stores the third and fourth bytes following the opcode; and (5) VMI_Win4 register 518 stores the fourth byte following the opcode. The following table illustrates an example of the relationship between the virtual machine instruction stream 502 and the VMI windows 505.

TABLE 3

| Name | Contents |
| --- | --- |
| Virtual Machine Instructions Stream | 0x80 a3 42 79 c3 |
| VM_Opcode | 0x00 00 00 80 |
| VMI_Win1 | 0xc3 79 42 a3 |
| VMI_Win2 | 0x00 c3 79 42 |
| VMI_Win3 | 0x00 00 c3 79 |
| VMI_Win4 | 0x00 00 00 c3 |

The behavior of the virtual machine coprocessor 130 instruction stream window registers can therefore be either little-endian or big-endian depending on the virtual machine being implemented. This may be done as a function of the endianness configured for the native processor 120.

Stack Emulation

When a stack-based virtual machine is executed on a stackless register machine, there may be little or no native support for stack operations. For example, the stack-based operation "ADD!" pops two operands off of a stack, adds the operands, and pushes the result onto the stack. A virtual machine coprocessor 130 can provide support for stack-based operations by emulating the stack functionality.

One mechanism that may be used to emulate a stack provides and maintains a virtual machine stack pointer that identifies the top of the stack within a block of allocated memory.

A register-based architecture typically provides a fixed number of registers that are high-speed data storage locations closely-coupled to a processing unit. In an exemplary register machine, a processor 120 may only perform arithmetic operations on the contents of the registers. In addition to storing data in registers, the register machine stores data in main memory controlled by a memory management unit. In this register-based architecture, the processor cannot perform arithmetic operations directly on data stored in main memory. To perform such operations, the processor may load data from main memory into registers, process the data, and store the result.

In general, main memory access is significantly slower than register access. Even when data is cached, main memory access typically takes significantly more time than register access. As a result, emulating a stack in main memory in this exemplary architecture adds the overhead of copying data from the stack to registers.

Alternatively, the virtual machine coprocessor 130 can support stack-based operations by storing data that is near the top of a stack in registers. When the data is stored in registers, 5 the virtual machine coprocessor 130 can generate native instructions to manipulate the data without the overhead associated with loading the data from main memory into registers.

Figure 6:
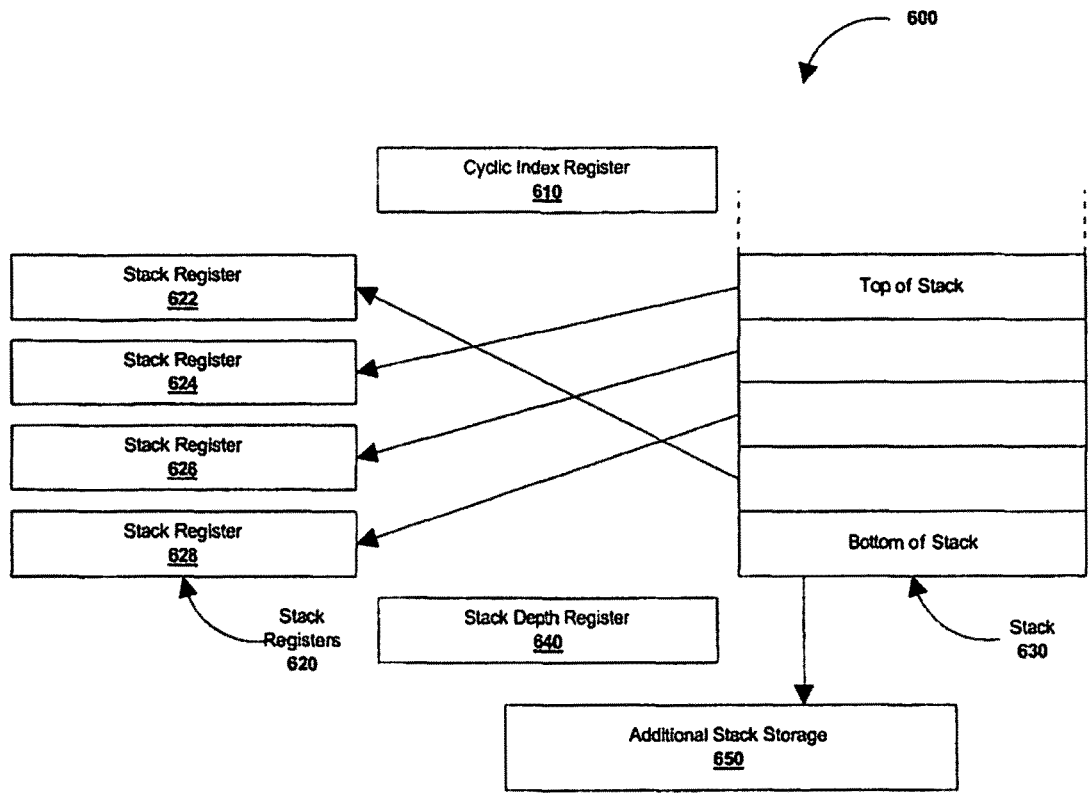
FIG. 6 is a block diagram of cyclic index registers used to represent the top of an operand stack.

Referring to FIG. 6, a register mapping system 600 uses a cyclic index register 610 to identify a register within a set of stack registers 620. In this example, four registers (i.e., stack registers 622, 624, 626, and 628) correspond to the top four items on a stack 630. To prevent unnecessary copying of data stored in the stack 630, the stack registers 620 may be logically defined in a circular order. For example, stack register 622 is followed by stack register 624 then stack register 626 then stack register 628, which circleback to register 622. If the stack depth (as indicated by the stack depth register 640) exceeds the number of available stack registers 620, then additional stack storage 650 may be used.

In this configuration, the cyclic index register 610 identifies the top of the stack 630. If a single data element is pushed on the stack, the data is stored in the register identified by the cyclic index register 610 and the cyclic index register 610 is updated accordingly. For example, consider pushing a value "10" onto the stack 630 where the cyclic index register 610 indicates that stack register 622 is the next free location at the top of the stack 63_0. In this example, the value "10" is written to stack register 622 and the cyclic index register 610 is updated. If a second number "20" is pushed onto the stack, that number is written to the logically adjacent register, in this case stack register 624.

By storing the topmost elements of the stack 630 in registers, stack-based abstract machine instructions 110 (e.g., IADD) may be translated into native machine instructions for execution on a register-based machine with less overhead. For example, the translation of IADD discussed above with reference to Table 1 used five native machine instructions. If, however, each operand is stored in a register, then the IADD instruction may be translated into a single register-based ADD instruction.

If the size of the stack exceeds the number of available stack registers 620, then portions of the stack may be stored elsewhere in additional stack storage 650, such as, for example, in main memory. A stack depth register 640 may be used to track the number of data elements stored in the stack registers 620. If the stack depth exceeds the number of stack registers 620, then no further data may be written to the stack registers 620 until one or more of the stack registers 620 are copied into the additional stack storage 650.

In some implementations, the virtual machine coprocessor 130 stores all data from the stack 630 in the stack registers 620 until the stack depth register 640 indicates that all stack registers 620 are utilized (i.e., the stack depth equals the number of available stack registers 620). Additional operations that would increase the stack depth beyond the number of available stack registers 620 are performed by first copying the element at the bottom of the stack to the additional stack storage 650, and then writing the new value into the next stack register indicated by the cyclic index register 610.

In a similar manner, when the stack depth register 640 indicates that the size of the stack exceeds the number of available stack registers 620, and a pop instruction is issued, the virtual machine coprocessor 130 pops the top data element off of the stack 630 and updates the cyclic index register 610 accordingly. Because an additional stack register 620 is available, the topmost stack element stored in the additional stack storage 650 is copied into the bottommost position of the stack registers 620. By copying stack elements from the additional stack storage 650 to the stack registers 620 as space becomes available, the load latency is overlapped with other operations such that stack elements in the stack registers 620 are likely to be available when needed.

In some implementations, the stack emulation system described above with reference to FIG. 6, is directed by microcode such that the cyclic index register 610 provides a technique for automating a rotating use of source/destination registers in the generated instruction stream to implement the top of an operand stack as is described in more detail below. The cyclic index register 610 can be written directly by software or modified by microcode. The value indicated by the cyclic index register 610 may be used as a possible selectable sources for register specifier fields within the native instruction (e.g., RS, RT, or RD in the MIPS32 instruction set). When being assigned to one of these fields, the current value of the cyclic index register 610 is passed through independent register index computation logic for each native instruction field, so that a microinstruction can specify multiple distinct register indices, each relative to the current value of the cyclic index register 610.

Execution Trace Buffer

Virtual machine architectures typically support execution of machine-independent source code or intermediate code. While machine-independent intermediate code may be somewhat optimized, it is difficult (if not impossible) to fully optimize code for execution on any platform. For example, while Java source code may be compiled into intermediate bytecodes that may be executed on any platform implementing the Java Virtual Machine (JVM), the intermediate bytecodes are optimized for the abstract JVM and not for any particular platform. When executing the intermediate NM bytecodes on a particular platform, additional optimization is often possible.

One technique that has been used to further optimize intermediate code for a particular target platform is dynamic compilation. A wide variety of dynamic compilation techniques have been developed. Many optimizations are performed using control-flow graphs or data-flow graphs to exploit locality and predictable flow information. These optimizations may be employed by a virtual machine in software to dynamically optimize code during execution, generating native machine instructions for execution by processor 120. A virtual machine coprocessor 130 may be used to collect information useful in performing dynamic optimization. By collecting this data through a hardware interface, the performance of dynamic optimization may be significantly improved.

Figure 7:
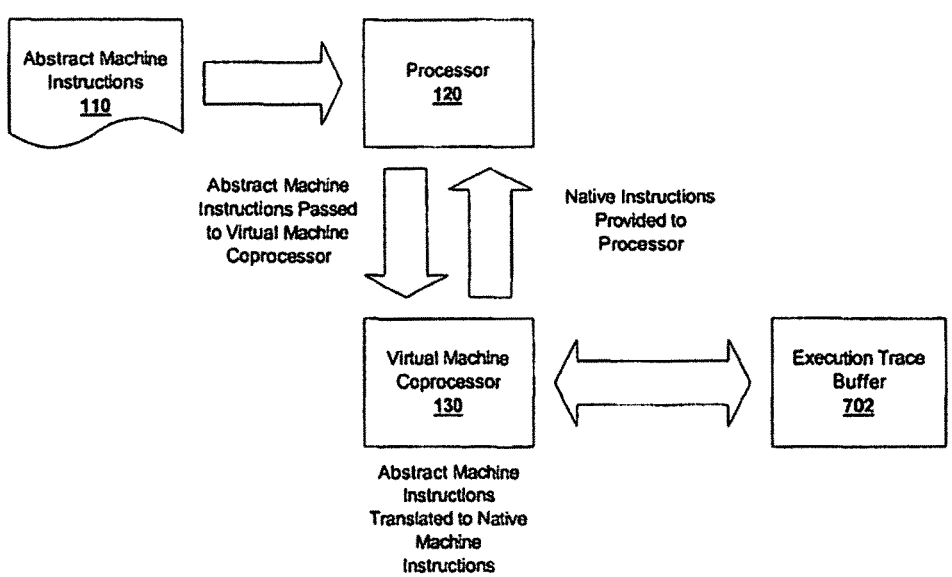
FIG. 7 is a block diagram of a platform providing a virtual machine coprocessor with an execution trace buffer.

Referring to FIG. 7, to facilitate and improve dynamic optimization, some implementations include an execution trace buffer (ETB) 702. The ETB 702 stores information that may be useful in dynamic compilation, such as, for example, a hardware trace of the execution history of virtual machine software. In an implementation of an ETB 702, the system stores a hardware trace of the execution history at the basic block level, where a basic block is a sequence of instructions that has only one point of entry and one point of departure such that when a basic block is entered, all instructions in that basic block will be executed. When a branch is encountered, the system determines whether the branch is taken and flow continues with one of two basic blocks based on that determination.

In this implementation, the execution history is represented as a cyclic digraph containing a data record for each basic block. The basic block's data record stores the following information: (1) the number of times the basic block has been executed; (2) an indication of the next basic block executed when a branch is taken; and (3) an indication of the frequency that the branch is taken. Additionally, the data record may include an indication of the next basic block executed when a branch is not taken and the start address of the represented basic block.

In this implementation, a data record for each basic block is generated and stored in the ETB 702. The beginning of a basic block is signaled by activation of a new virtual machine program counter (VMPC), or by the clearing of a conditional branch. When execution of a new basic block begins, the system updates the basic block's data record in the ETB 702. If no data record exists, a new data record is created to represent that basic block.

New data records may be created until the storage capacity of ETB 702 is exhausted, which can trigger a coprocessor exception so that the operating system (or the virtual machine) can handle the exception. For example, upon exhaustion of the resources of the ETB 702, the virtual machine may extract the data records and convert the data to a form convenient for the virtual machine's use. This data may be used to selectively compile to optimize native code for those sequences of basic blocks which satisfy its criteria. Once the data has been extracted, the ETB 702 may be cleared or reset and processing may resume.

The ETB 702 described above may be augmented to store additional information, such as information regarding method invocation sequences. Unlike basic blocks, there may be more than two possible successor methods, so traces may not necessarily be meaningful execution graphs. In addition, information such as invocation counts may be useful in performing additional dynamic optimization.

Using information stored by ETB 702, a virtual machine may extract information from a virtual machine coprocessor 130 to perform various dynamic optimizations.

The exemplary ETB 702 implementation described above operates in a trap-on-full mode-when the ETB 702 resources are exhausted, a trap is issued, allowing software (e.g., virtual machine) to handle the event. In some implementations, the ETB 702 may be configured to reuse resources using a heuristic, such as, for example, by reusing the least heavily referenced block entries. This technique may allow a virtual machine coprocessor 130 to provide a meaningful statistical trace using a small ETB 702.

RISC Based Virtual Machine Coprocessor Implementation

Each of the described techniques may be more fully understood through the following description of a virtual machine coprocessor 130 implementation for a RISC-based platform. This implementation provides a virtual machine coprocessor 130 capable of accelerating the interpreted execution of programs encoded in Java or Microsoft CLR bytecodes by a significant factor, while also accelerating dynamic compilation.

In this implementation, the virtual machine coprocessor 130 provides 18 registers, including 15 general coprocessor data registers and three coprocessor control registers, as indicated in the following tables.

TABLE 4

Coprocessor Data Registers

| Number | Name | Width |
|---|---|---|
| 0 | VMPC | 32 |
| 1 | VMIB_Entry | 64 |
| 2 | VM_Opcode | 32(8) |

TABLE 4-continued

Coprocessor Data Registers

| Number | Name | Width |
| --- | --- | --- |
| 3 | VMI_Win1 | 32 |
| 4 | VMI_Win2 | 32 |
| 5 | VMI_Win3 | 32 |
| 6 | VMI_Win3 | 32 |
| 7 | Condition | 32(8) |
| 8 | VM_SW_Vector | 32 |
| 9 | NIB_Control | 32 |
| 10 | NIB_Entry | 64 |
| 11 | Cyclic_Index_Control | 32(10) |
| 12 | IBG_Entry | 64 |
| 13 | ETB_EntryLo | 64 |
| 14 | ETB_EntryHI | 64 |

TABLE 5

Coprocessor Control Registers

| Number | Name | Width |
| --- | --- | --- |
| 0 | VMC_IMPL | 32 |
| 1 | VM_Instruction_Count | 32 |
| 31 | VMC_CSR | 32 |

The VMPC register is a virtual machine coprocessor register containing a 32-bit virtual memory address of the instruction currently being interpreted by the virtual machine. As will be discussed below, the VMPC register may be set to arbitrary values by coprocessor instructions or incremented by the virtual machine coprocessor 130.

The VMIB_Entry register is a virtual machine instruction buffer that allows data to be read from or written to a virtual machine instruction buffer (VMIB). The VMIB contains a sequence of binary virtual machine instructions to be translated and executed by the virtual machine coprocessor 130. In this implementation, the VMIB may be thought of as a byte-wise FIFO queue, with the head of the queue representing the next instruction to be translated. The VMIB may be explicitly loaded using the VMIB_Entry register, or may be automatically loaded using an autonomous fetch engine.

Writes to the VMIB_Entry register cause the written data to be appended to the current virtual machine instruction stream. In this implementation, the contents written to the VMIB_Entry register should be a 64-bit aligned block of memory.

The VM_Opcode register contains the byte addressed by the current VMPC, zero extended so that it may be used as an unsigned index value by a software virtual machine.

As described above with reference to FIGS. 5A and 5B and Tables 2 and 3, the virtual machine instruction (VMI) windows 505 are used to access portions of the instruction word located at the current VMPC. The VMI_Win1 register provides a 32-bit value whose address is VMPC+1. The content of VMI_Win1 thus depends on the endianness of the system.

Likewise, the VMI_Win2 register provides a 32-bit value whose address is VMPC+2, the VMI_Win3 register provides a 32-bit value whose address is VMPC+3, and the VMI_Win4 register provides a 32-bit value whose address is VMPC+4.

The Condition register is a software-writable register that satisfies condition interlocks and provides a value to the virtual machine coprocessor 130. Writing to the Condition register clears a condition interlock so that the virtual machine processor 130 may fetch instructions past the condition interlock.

The VM_SW_Vector register contains an entry point into a software virtual machine. This allows the virtual machine coprocessor 130 to pass control to a software virtual machine by instructing the processor 120 to jump to the entry point contained in the VM_SW_Vector register.

The NIB_Control register contains "head" and "tail" pointers that control the fetchable and writable state of native instruction buffers. The virtual machine coprocessor 130 translates abstract machine instructions 110 into native instructions that are stored in a native instruction buffer (NIB) as discussed above. These native instructions are issued to the processor 120 from the head of the NIB as indicated by 16 bits of the NIB_Control register and are written by the virtual machine coprocessor 130 to the NIB at the location indicated by the tail of the NIB as indicated by 16 bits of the NIB_Control register. This implementation will support a NIB having up to 64K entries. If a larger NIB is desired, the NIB_Control register may be extended to 64 bits.

The NIB_Entry register is used by the virtual machine coprocessor 130 to write assembled native instructions into the NIB. Additionally, the NIB_Entry register may be used by software to save and restore the NIB contents as part of a process context. In this implementation, though 32-bit native instructions are generated, the NIB_Entry register is 64-bits wide, which allows the virtual machine coprocessor 130 to insert two instructions at a time into the NIB. If the virtual machine coprocessor 130 is only able to generate one instruction at a time, the instruction is placed in the least significant word of the NIB_Entry register.

The Cyclic_Index_Control register contains the value of the cyclic index register 610 as well as a cyclic index mask. The functionality of the cyclic index mask will be described in detail below.

The IGB_Entry register is an idiom glossary buffer entry. register used in systems that support variable length opcodes and virtual machine idioms.

The ETB_EntryHi register is a 64-bit register that stores the 32-bit start address of a basic block and the 32-bit execution count of that basic block to support execution tracing.

The ETB_EntryLo register is a 64-bit register that stores a 16-bit indication of the next basic block if a branch is taken, a 16-bit indication of the next basic block if a branch is not taken, and a 32-bit count of the number of times the branch is taken. The ETB_EntryHi register and ETB_EntryLo register correspond to one another and are used to dump execution trace information to software.

The VMC_IMPL register is a read-only control register that provides information on the hardware parameters of a virtual machine coprocessor 130 implementation. For example, the VMC_IMPL register may encode the number of execution trace buffer (ETB) entries that are provided by the hardware, the depth of the virtual machine instruction buffer (VMIB), and the size of the native instruction buffer.

The VM_Instruction_Count register is a control register to allow software to monitor and control virtual machine coprocessor 130 execution. If the value of the VM_Instruction_Count register is non-zero, then the register is decremented on each advance of the VMPC. If the decrement results in a zero value, a coprocessor exception is raised to the processor 120. A zero value is not decremented and does not cause further exceptions to be raised. The VM_Instruction_Count register may be used, for example, to generate an exception so that the system may detect and recover from an infinite loop.

The VMC_CSR register provides control and status information accessible by software concerning the virtual machine coprocessor 130. In this implementation, the VMC_CSR register includes 6 bits as follows: (1) a GO bit indicating whether the virtual machine coprocessor 130 is active and is translating instructions; (2) a ICZ bit indicating that the VM_Instruction_Count register has transitioned to zero and caused an exception to be raised; (3) a TBF bit indicating that the last ETB entry has been allocated and the trace buffer is full; (4) a BI bit indicating that a branch interlock condition is in effect and that further translation of virtual machine instructions is stopped until the interlock is cleared; (5) a CI bit indicating that a condition interlock is in effect and that further generation of native machine instructions is stopped until the condition interlock is cleared; and (6) a CV bit indicating that the Condition register is valid and can be used to compute a conditional microcode fetch address.

Using the registers described above, a series of instructions for virtual machine coprocessor 130 are provided to allow the virtual machine coprocessor 130 to be monitored and controlled by software or by itself through the feedback techniques described above.

Referring to FIG. 8A, the SVMPC (set VMPC and clear branch interlock) instruction sets the VMPC register to the value stored in general purpose register (GPR). rs and clears the BI branch interlock of the VMC_CSR register so that translation and execution may resume at the new VMPC. If the content of the rs register is zero, no modification of the VMPC is performed, but the branch interlock is still cleared. This allows implementation of branches not taken without the presence of conditional branches in the native instruction stream.

Referring to FIG. 8B, the MHFC2 (move signed halfword from coprocessor register) instruction sign-extends the least significant halfword of the coprocessor register cs and deposits the resulting value in GPR rt. This allows software, such as a software virtual machine, to view and process data from internal registers of virtual machine coprocessor 130 in native halfword quantities without requiring conversion.

Referring to FIG. 8C, the MHUFC2 (move unsigned halfword from coprocessor register) instruction functions similarly to the MHFC2 instruction, but differs in that the least significant halfword of coprocessor register cs is zero extended instead of sign-extended and the resulting zero-extended value is deposited in GPR rt.

Referring to FIG. 8D, the MBFC2 (move signed byte from coprocessor register) instruction functions similarly to the MHFC2 instruction, but operates on the least significant byte instead of the least-significant halfword. The MBFC2 instruction sign-extends the least significant byte of coprocessor register cs and deposits the resulting value in GPR rt.

Referring to FIG. 8E, the MBUFC2 (move unsigned byte from coprocessor register) instruction zero-extends the least significant byte of coprocessor register cs and deposits the resulting value in GPR rt.

Referring to FIG. 8F, the INRW (move word to register and insert value into backing structure) instruction moves the 32-bit value in GPR rt to the least significant 32-bits of coprocessor register cs and performs an ordered insertion of the value into the multi-entry sequential structure (e.g., NIB, IGB) associated with that register.

Referring to FIG. 8G, the INRD (move double to register and insert value into backing structure) instruction moves the 64-bit value in GPR rt to the coprocessor register cs and performs an ordered insertion of the value into the multi-entry sequential structure (e.g., NIB, IGB) associated with the register.

Referring to FIG. 8H, the EXRW (extract value from backing structure and move word from register) instruction performs an ordered extraction and deletion from the multi-entry sequential structure (e.g., NIB, 1 GB) associated with coprocessor register cs into the coprocessor register cs. Then, the least significant 32 bits of the contents of coprocessor register cs are copied to GPR rt. The extraction of a 64-bit structure entry on a 32-bit processor 120 may be performed using EXRW followed by MFHC2.

Referring to FIG. 1, the EXRD (extract value from backing structure and move double from register) instruction performs an ordered extraction and deletion from the multi-entry sequential structure (e.g., NIB, 1 GB) associated with coprocessor register cs into the coprocessor register cs. The 64-bit value in coprocessor register cs then is copied to GPR rt.

Instruction translation in the virtual machine coprocessor core logic 206 is performed using the core logic 206 and the microcode store 208. The core logic 206 takes an abstract machine instruction 110 from the head of the VMIB and generates native machine instructions based on the contents of microcode store 208, the contents of certain coprocessor registers, and the state of conditional and branch interlocks. In addition to generating native instructions, the core logic 206 also generates advance signals to the VMIB and virtual machine instruction windows, new values for registers local to the core logic 206, the next microcode address, and the state of conditional and branch interlocks.

The microcode store 208 maintains a series of microcode instructions that may be used to generate native instructions. In an exemplary encoding, each microcode instruction word includes information as shown in the following table.

TABLE 6

| Fields | | |
|---|---|---|
| Name | Bits | Description |
| Data | 32 | Immediate data which may be used to construct a native instruction or internal register value. |
| RS Select | 3 | Control bits 25:21 of NIB entry. |
| RT Select | 3 | Control bits 20:16 of NIB entry. |
| RD Select | 3 | Control bits 15:11 of NIB entry. |
| SA Select | 2 | Control bits 10:6 of NIB entry. |
| Func Select | 1 | Control bits 5:0 of NIB entry. |
| Immed Select | 4 | Control bits 15:0 of NIB entry. |
| NIB Select | 1 | If dual NIBs are supported, selects NIB for commit. |
| NIB Commit | 1 | Write NIB entry to NIB and advance the NIB write address. |
| Branch Interlock | 1 | Indicates current instruction is a branch. |
| Condition Interlock | 1 | Condition register to be added to the Next Address field to form the address of the next microinstruction to be executed. |
| VMPC Advance | 4 | Value to be added to the VMPC. |
| New Decode | 1 | If set, the next microinstruction fetch will be based on a fresh decode of the current virtual machine opcode. If not set, the next microinstruction will be a continuation of the current decode, based on the Next Address value of the current instruction. |

TABLE 6-continued

| Fields | | |
|---|---|---|
| Name | Bits | Description |
| Stack Depth Qualified Decode | 1 | If set, and the StackDepth value is greater than (1& cyclic index mask), VMPC Advance and New Decode are inhibited. |
| CIR Control | 3 | Controls cyclic index register. |
| ETB Enable | 1 | If the current operation is a branch, as indicated by the Branch Interlock, activate the ETB logic to sample the next VMPC translated and executed. |
| Next Address | 16 | If New Decode is inactive or inhibited, this value is used as the address of the next microinstruction. |

The fields identified in Table 6 are described in greater detail below. First, the Data field of a microinstruction word provides 32-bit immediate data which may be used to construct a native instruction or internal register value.

The RS Select, RT Select, and RD Select fields are each 3-bit fields that may be used to set the RS, RT, and RD portions of native instructions. The RS Select field controls the write of bits 25:21 of the NIB_Entry register, the RT Select field controls bits 20:16, and the RD Select field controls bits 15:11. The following table describes the possible values for each of these fields.

TABLE 7

| Value | Function |
|---|---|
| 000 | No modification of controlled bits (previous value retained if Immed Select is also 0). |
| 001 | Copy corresponding bits from Data to NIB_Entry. |
| 100 | Copy CIR to controlled bits of NIB_Entry. |
| 101 | Copy CIR-1 to controlled bits of NIB_Entry. |
| 110 | Copy CIR-2 to controlled bits of NIB_Entry. |
| 111 | Copy CIR-3 to controlled bits of NIB_Entry. |

The Func Select field, if set, copies Data bits 5:0 to the NIB_Entry, so long as the Immed Select field is zero. The Immed Select field controls the write of bits 15:0 of the NIB_Entry. If the Immed Select field is non-zero, the RD Select and SA select fields must both be zero. If the Immed Select field of the microinstruction selects data from one of the virtual instruction windows, and the selected bytes have not been loaded into the VMIB, translation stalls until the selected bytes are valid. The following table describes the possible values for the Immed Select field.

TABLE 8

| Value | Function |
|---|---|
| 0000 | No modifications of bits 15:0 (previous value retained if RD Select and SA Select are also zero. |
| 0001 | Copy Data bits 15:0 to NIB_Entry. |
| 0010 | Zero-extend least significant byte of VMI_Win1. |
| 0011 | Sign-extend least significant byte of VMI_Win1. |
| 0100 | Zero-extend least significant byte of VMI_Win2. |

TABLE 8-continued

| Value | Function |
|---|---|
| 0101 | Sign-extend least significant byte of VMI_Win2. |
| 0110 | Zero-extend least significant byte of VMI_Win3. |
| 1000 | Halfword 0 of VMIB (least significant halfword of VMI_Win1 in little-endian mode, VMI_Win2in big-endian). |
| 1001 | Halfword 1 of VMIB (least significant halfword of VMI_Win2 in little-endian mode, VMI_Win3in big-endian). |
| 1010 | Halfword 2 of VMIB (least significant halfword of VMI_Win3 in little-endian mode, VMI_Win4in big-endian). |
| 1100 | Least significant halfword of VM_SW_Vector. |
| 1101 | Most significant halfword of VM_SW_Vector. |
| 1110 | Least significant halfword of VMPC. |
| 1111 | Most significant halfword of VMPC. |

The NIB Select field and NIB Commit field are used to control NIB interaction. The NIB Select field allows a microinstruction to select which NIB to use when multiple NIBs are available. In this implementation, the NIB Select field is one bit, and, as a result, only two NIBs may be addressed. If additional NIBs are desired, then the NIB Select field may be widened to provide sufficient bits to address each available NIB. The NIB Commit field causes the virtual machine coprocessor 130 to write the value of the NIB_Entry register to the NIB and advance the NIB write address. If the NIB is unable to accept an instruction due to a buffer-full state, the coprocessor microprogram will stall until the NIB_Entry can be written.

The Branch Interlock field identifies the current instruction as a branch. This field is valid only if VMPC Advance is non-zero and not masked by a Stack Depth or other qualifier. The Branch Interlock field causes the system to set the BI bit of the VMC_CSR register and stop the generation of translated instructions until the native pipeline has indicated a branch or condition not taken via a SVMPC instruction.

The Condition Interlock field—indicates that the Condition register is to be added to the Next Address field to form the address of the next microinstruction to be executed. This field causes the system to set the CI bit of the VMC_CSR register. If the CV (Condition Valid) bit of the VMC_CSR register is not set when Condition Interlock is asserted, the coprocessor microprogram will stall pending a write to the Condition register by the processor 120. If the CV bit is set, the address calculation is performed and the CV bit is cleared.

The VMPC Advance field contains a 4-bit value that is to be added to the VMPC to advance to the next virtual machine instruction.

The New Decode field may be set to indicate that the next microinstruction fetch will be based on a fresh decode of the current opcode. If the New Decode field is not set, the next microinstruction will be a continuation of the current decode, based on the Next Address value of the current instruction.

The Stack Depth Qualified Decode field may be set to inhibit VMPC Advance and New Decode so long as the Stack Depth is greater than (−1 & cyclic index mask). If VMPC Advance and New Decode are inhibited, the next microinstruction is fetched based on the Next Address field rather than advancing to the next instruction in the VMIB.

The CIR Control field is a 3-bit field that may be used to update the stack depth register and cyclic index register. The cyclic index register provides a means for automating a rotating use of source/destination registers in the generated instruction stream to implement the top of an operand stack. As the source/destination registers are selected, the value of the CIR Control field is passed through an independent adder for each native instruction so that a microinstruction can specify multiple distinct register indices, each relative to the current CIR value. The possible CIR Control field values are shown in the following table.

TABLE 9

| Value | Function |
|---|---|
| 000 | No change to CIR. |
| 001 | Increment CIR. |
| 010 | Decrement CIR. |
| 101 | Increment CIR, decrement Stack Depth. |
| 110 | Decrement CIR, increment Stack Depth. |
| 111 | Set CIR to Data [3:0], clear Stack Depth. |

On increment and decrement operations, the cyclic index register is only updated for bits which are enabled by the cyclic index mask. This mask allows the CIR to cycle through sequences of 4, 8, or 16 register indices. The mask is also applied to the calculation of incremented/decremented CIR values used in native instruction composition.

Several techniques have been described to implement a virtual machine coprocessor 130. These techniques may be used alone or in combination with one another based on the design constraints of a particular implementation. For example, if the abstract machine instructions 110 supported by the virtual machine coprocessor 130 are not stack based, then cyclic index registers 610 may not be useful.

The ETB Enable field may be used to enable execution trace buffer updates. If the current operation is a branch (i.e., the Branch Interlock is asserted) and execution trace buffer updates are enabled, the system activates the ETB logic to sample the next VMPC translated and executed.

Finally, the Next Address field may be used to determine the address of the next microinstruction. This field is used if New Decode is inactive or inhibited.

Using this implementation of a virtual machine coprocessor 130, microcode may be used to translate abstract machine instructions 110 to native instructions for execution by processor 120 as shown in the following examples.

As shown in the Table 10, a Java Virtual Machine (JVM) integer operation may be translated into native machine code in a single native cycle if the operand stack depth is less than 4. Otherwise, 3 cycles may be used to update the top-of-stack cache and the stack pointer. Because of explicit next address sequencing, the last two optionally-executed microinstructions can have a single instantiation.

TABLE 10

| | Step | | |
|---|---|---|---|
| Field | 0 | 1 | 2 |
| Data | ADD ? ? ? | LW ?, 0(JSP) | ADDI JSP,JSP,4 |
| RS Select | CIR-1 | From Data | From Data |
| RT Select | CIR-2 | CIR-3 | From Data |
| RD Select | CIR-2 | Null | Null |
| SA Select | From Data | Null | Null |
| Func Select | From Data | Null | From Data |
| Immed Select | Null | From Data | From Data |
| NIB Commit | TRUE | TRUE | TRUE |
| Branch Interlock | FALSE | FALSE | FALSE |
| Condition Interlock | FALSE | FALSE | FALSE |

TABLE 10-continued

| | Step | | |
|---|---|---|---|
| Field | 0 | 1 | 2 |
| VMPC Advance | 1 | 0 | 1 |
| New Decode | TRUE | FALSE | TRUE |
| Stack Depth Qualified Decode | TRUE | FALSE | FALSE |
| CIR Control | CIR--,SD-- | Null | Null |
| ETB Enable | FALSE | FALSE | FALSE |
| Next Address | Step 1 (Next Col.) | Step 2 (Next Col.) | Null |

An IADD operation pops the top two operands off the operand stack, adds the values, and pushes the result back on the operand stack. In this example, the Data field provides a template for a native ADD instruction and the RS Select, RT Select, and RD Select fields are used to identify its operands. In this example, the Stack Depth Qualified Decode field is set. If the stack depth is not exceeded, the VMPC Advance and New Decode operate to decode the next virtual machine instruction. If the stack depth is exceeded, the VMPC Advance and New Decode fields are inhibited and control passes to "Step 1" as indicated by the Next Address field.

In addition to virtual machine coprocessors using hardware (e.g., within or coupled to a microprocessor or microcontroller), implementations also may be embodied in software disposed, for example, in a computer usable (e.g., readable) medium configured to store the software (i.e., computer readable program code or data). The software enables the functions of fabrication, modeling, simulation, and/or testing of the systems and techniques disclosed herein. For example, this can be accomplished through the use of general programming languages (e.g., C, C++), GDSIT, hardware description languages (HDL) including Verilog HDL, VHDL, AHDL (Altera HDL) and so on, or other available databases, programming and/or circuit (i.e., schematic) capture tools. The software can be disposed in any known computer usable medium including semiconductor, magnetic disk, optical disk (e.g., CD-ROM, DVD-ROM) and as a computer data signal embodied in a computer usable (e.g., readable) transmission medium (e.g., carrier wave or any other medium including digital, optical, or analog-based medium). As such, the software can be transmitted over communication networks including the Internet and intranets. A virtual machine coprocessor embodied in software may be included in a semiconductor intellectual property core (e.g., as HDL) and transformed to hardware in the production of integrated circuits. Additionally, a virtual machine coprocessor may be embodied as a combination of software and hardware.

A number of implementations have been described. Nevertheless, it will be understood that various modifications may be made. Accordingly, other implementations are within the scope of the following claims.

What is claimed is:

1. A system comprising:
storage having a plurality of abstract machine instructions;
an execution trace buffer storing information to facilitate dynamic compilation;
a virtual machine coprocessor configured to obtain one or more of the plurality of abstract machine instructions and translate the obtained abstract machine instructions to one or more native instructions;
a processor coupled to the virtual machine coprocessor, the processor operable to load the abstract machine instructions into the virtual machine coprocessor for translation, and to fetch and execute the translated native machine instructions generated by the virtual machine coprocessor, wherein the processor comprises a virtual machine in software, wherein the virtual machine is to obtain, from the virtual machine coprocessor, the information stored in the execution trace buffer, and where the virtual machine is to use the information to perform dynamic compilation to generate optimized native machine instructions for execution by the processor.

2. The system of claim 1 wherein the plurality of abstract machine instructions include Java instructions.

3. The system of claim 1 wherein the plurality of abstract machine instructions includes Common Language Runtime instructions.

4. The system of claim 1 wherein the information to facilitate dynamic compilation includes data records corresponding to basic blocks of the plurality of abstract machine instructions.

5. The system of claim 4 wherein the information to facilitate dynamic compilation includes a data record corresponding to each executed basic block of the plurality of abstract machine instructions.

6. The system of claim 4 wherein the data records corresponding to basic blocks of the plurality of abstract machine instructions include:
   an identifier field indicating a basic block;
   a counter field indicating the number of times the basic block has been executed; and
   a successor field indicating one or more successive basic blocks.

7. The system of claim 6 wherein the successor field includes:
   a branch taken field indicating a successive basic block if a branch is taken;
   a branch not taken field indicating a successive basic block if a branch is not taken; and
   a branch counter field indicating either the number of times a branch is taken or the number of times a branch is not taken.

8. The system of claim 1, wherein the information to perform dynamic compilation to generate optimized native machine instructions for execution by the processor comprises a hardware trace of the execution history of the virtual machine software at the basic block level.

9. The system of claim 8, wherein the information comprises a data record for each basic block.

10. The system of claim 9, wherein new data records are created until the storage capacity at the execution trace buffer is exhausted.

11. The system of claim 10, wherein a coprocessor exception is triggered when the capacity of the execution trace buffer is exhausted and where the virtual machine in software is, in response to the exception, to extract the data records and convert the data to a form convenient to the virtual machines use.

12. The system of claim 11, wherein the virtual machine is to use the converted data to selectively compile to optimize native code for one or more sequences of basic blocks which satisfy a criteria of the converted data.

13. A virtual machine coprocessor comprising:
   an abstract machine instruction interface that receives a plurality of abstract machine instructions;
   a native machine instruction interface that provides one or more native machine instructions for execution by a processor;
   an execution trace buffer interface that maintains information to facilitate dynamic compilation;
   virtual machine coprocessor core logic coupled to the abstract machine interface, the virtual machine coprocessor core logic operable to obtain one or more of the plurality of abstract machine instructions to translate the obtained abstract machine instructions to one or more native instructions;
   wherein the virtual machine coprocessor provides the information at the execution trace buffer to a virtual machine in software on the processor to enable the virtual machine to use dynamic compilation to optimize the native machine instructions for execution by the processor.

14. The virtual machine coprocessor of claim 13 wherein the plurality of abstract machine instructions includes Java virtual machine instructions.

15. The virtual machine coprocessor of claim 13 wherein the plurality of abstract machine instructions includes Common Language Runtime instructions.

16. The virtual machine coprocessor of claim 13 wherein the information to facilitate dynamic compilation includes data records corresponding to basic blocks of the plurality of abstract machine instructions.

17. The virtual machine coprocessor of claim 16 wherein the information to facilitate dynamic compilation includes a data record corresponding to each executed basic block of the plurality of abstract machine instructions.

18. The virtual machine coprocessor of claim 16 wherein the data records corresponding to basic blocks of the plurality of abstract machine instructions include:
   an identifier field indicating a basic block;
   a counter field indicating the number of times the basic block has been executed; and
   a successor field indicating one or more successive basic blocks.

* * * * *